United States Patent
Bialer et al.

(10) Patent No.: US 11,714,187 B2
(45) Date of Patent: Aug. 1, 2023

(54) FREQUENCY DIVISION MULTIPLE ACCESS IN VEHICLE RADAR SYSTEM

(71) Applicant: GM Global Technology Operations LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 218 days.

(21) Appl. No.: 17/121,976

(22) Filed: Dec. 15, 2020

(65) Prior Publication Data
US 2022/0187419 A1 Jun. 16, 2022

(51) Int. Cl.
| | |
|---|---|
| G01S 7/35 | (2006.01) |
| G01S 13/931 | (2020.01) |
| G01S 13/87 | (2006.01) |
| G01S 7/285 | (2006.01) |
| G01S 13/34 | (2006.01) |
| G01S 7/282 | (2006.01) |
| G01S 13/42 | (2006.01) |

(52) U.S. Cl.
CPC .......... *G01S 13/878* (2013.01); *G01S 13/931* (2013.01); *G01S 7/282* (2013.01); *G01S 7/285* (2013.01); *G01S 7/356* (2021.05); *G01S 13/343* (2013.01); *G01S 13/42* (2013.01); *G01S 2013/9316* (2020.01)

(58) Field of Classification Search
CPC ...... G01S 7/352; G01S 13/878; G01S 13/931; G01S 7/356; G01S 2013/9316; G01S 13/343; G01S 13/42
See application file for complete search history.

(56) References Cited

U.S. PATENT DOCUMENTS

| | | | |
|---|---|---|---|
| 2015/0204966 A1* | 7/2015 | Kishigami | G01S 13/42 342/189 |
| 2016/0223643 A1* | 8/2016 | Li | G01S 7/0236 |
| 2019/0056478 A1* | 2/2019 | Millar | H04B 1/69 |
| 2020/0025865 A1* | 1/2020 | Gulati | G01S 13/42 |
| 2020/0249340 A1* | 8/2020 | Yeh | G01S 13/04 |
| 2020/0309939 A1* | 10/2020 | Subburaj | G01S 7/352 |
| 2021/0149019 A1* | 5/2021 | Subburaj | G01S 7/40 |
| 2021/0156982 A1* | 5/2021 | Stettiner | G01S 13/347 |

* cited by examiner

*Primary Examiner* — Timothy A Brainard
*Assistant Examiner* — Ismaaeel A. Siddiquee
(74) *Attorney, Agent, or Firm* — Cantor Colburn LLP

(57) ABSTRACT

A method of implementing frequency division multiple access (FDMA) in a radar system of a vehicle includes transmitting a chirp signal from each of a plurality of transmit elements of the radar system simultaneously. The chirp signal transmitted by each of the plurality of transmit elements increases or decreases linearly in frequency over a frequency range over a duration of time and the frequency range of the chirp signal transmitted by adjacent ones of the plurality of transmit elements partially overlapping. The method also includes processing a reflection received based on reflection of the chirp signal transmitted by the plurality of transmit elements by one or more objects and controlling an operation of the vehicle based on locating the one or more objects.

15 Claims, 3 Drawing Sheets

FREQUENCY DIVISION MULTIPLE ACCESS IN VEHICLE RADAR SYSTEM

INTRODUCTION

The subject disclosure relates to frequency division multiple access (FDMA) in a radar system of a vehicle.

Vehicles (e.g., automobiles, trucks, construction equipment, farm equipment, automated factory equipment) increasingly include sensors to obtain information about the vehicle and its surroundings. The information facilitates semi-autonomous and autonomous operation of the vehicle, for example. Exemplary sensors include cameras, light detection and ranging (lidar) systems, and radio detection and ranging (radar) systems. In a radar system with multiple transmitters and multiple receivers, known as a multi input multi output (MIMO) radar system, different schemes are employed to facilitate resolving the reflections that result from the different transmitters. Time divisional multiple access (TDMA) and code division multiple access (CDMA) schemes have known drawbacks. Accordingly, it is desirable to provide a radar system of a vehicle employing frequency division multiple access (FDMA).

SUMMARY

In one exemplary embodiment, a method of implementing frequency division multiple access (FDMA) in a radar system of a vehicle includes transmitting a chirp signal from each of a plurality of transmit elements of the radar system simultaneously. The chirp signal transmitted by each of the plurality of transmit elements increases or decreases linearly in frequency over a frequency range over a duration of time and the frequency range of the chirp signal transmitted by adjacent ones of the plurality of transmit elements partially overlapping. The method also includes processing a reflection received based on reflection of the chirp signal transmitted by the plurality of transmit elements by one or more objects and controlling an operation of the vehicle based on locating the one or more objects.

In addition to one or more of the features described herein, the chirp signal transmitted by every one of the plurality of transmit elements has a same slope.

In addition to one or more of the features described herein, a start of the frequency range of the chirp signal transmitted by every one of the plurality of transmit elements differs from the start of the frequency range of the chirp signal transmitted by every other one of the plurality of transmit elements by a different multiple of a frequency offset.

In addition to one or more of the features described herein, the frequency offset is B and is given by:

$$B = \frac{2}{s} R_{max} \alpha,$$

where
s is the speed of light, $R_{max}$ is the maximum detectable range of the radar system, and $\alpha$ is the slope.

In addition to one or more of the features described herein, the method also includes multiplying the reflection with a reference signal to obtain a frequency difference result. The reference signal is one of the chirp signals transmitted by one of the plurality of transmit elements and the frequency difference result separates a component of the reflection corresponding with each chirp transmitted by the plurality of transmit elements into a different frequency range.

In addition to one or more of the features described herein, the frequency difference result associated with each of the plurality of transmit elements includes components separated from the frequency difference result associated with every other one of the plurality of transmit elements by a frequency shift D.

In addition to one or more of the features described herein, the method also includes performing a range fast Fourier transform (FFT) on the frequency difference result.

In addition to one or more of the features described herein, the method also includes identifying a range bin associated with a range hypothesis corresponding with each of the components.

In addition to one or more of the features described herein, the method also includes compensating for phase variations according to the range bin identified in correspondence with each of the components to obtain a vector z in terms of absolute range that represents the reflection. A number of elements of the vector z is a number of the components.

In addition to one or more of the features described herein, the method also includes performing beamforming with a range-independent beamforming matrix and applying a detection threshold to locate the one or more objects.

In another exemplary embodiment, a vehicle with a radar system implementing frequency division multiple access (FDMA) includes a plurality of transmit elements of the radar system. Each of the plurality of transmit elements transmits a chirp signal simultaneously. The chirp signal transmitted by each of the plurality of transmit elements increases or decreases linearly in frequency over a frequency range over a duration of time and the frequency range of the chirp signal transmitted by adjacent ones of the plurality of transmit elements partially overlapping. The vehicle also includes a controller to process a reflection received by a receive element of the radar system based on reflection of the chirp signal transmitted by the plurality of transmit elements by one or more objects and to control an operation of the vehicle based on locating the one or more objects.

In addition to one or more of the features described herein, the chirp signal transmitted by every one of the plurality of transmit elements has a same slope.

In addition to one or more of the features described herein, a start of the frequency range of the chirp signal transmitted by every one of the plurality of transmit elements differs from the start of the frequency range of the chirp signal transmitted by every other one of the plurality of transmit elements by a different multiple of a frequency offset.

In addition to one or more of the features described herein, the frequency offset is B and is given by:

$$B = \frac{2}{s} R_{max} \alpha,$$

where
s is the speed of light, $R_{max}$ is the maximum detectable range of the radar system, and $\alpha$ is the slope.

In addition to one or more of the features described herein, the controller multiplies the reflection with a reference signal to obtain a frequency difference result, wherein the reference signal is one of the chirp signals transmitted by one of the plurality of transmit elements and the frequency difference result separates a component of the reflection corresponding with each chirp transmitted by the plurality of transmit elements into a different frequency range.

In addition to one or more of the features described herein, the frequency difference result associated with each of the plurality of transmit elements includes components separated from the frequency difference result associated with every other one of the plurality of transmit elements by a frequency shift D.

In addition to one or more of the features described herein, the controller performs a range fast Fourier transform (FFT) on the frequency difference result.

In addition to one or more of the features described herein, the controller identifies a range bin associated with a range hypothesis corresponding with each of the components.

In addition to one or more of the features described herein, the controller compensates for phase variations according to the range bin identified in correspondence with each of the components to obtain a vector z in terms of absolute range that represents the reflection, a number of elements of the vector z being a number of the components.

In addition to one or more of the features described herein, the controller performs beamforming with a range-independent beamforming matrix and apply a detection threshold to locate the one or more objects.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
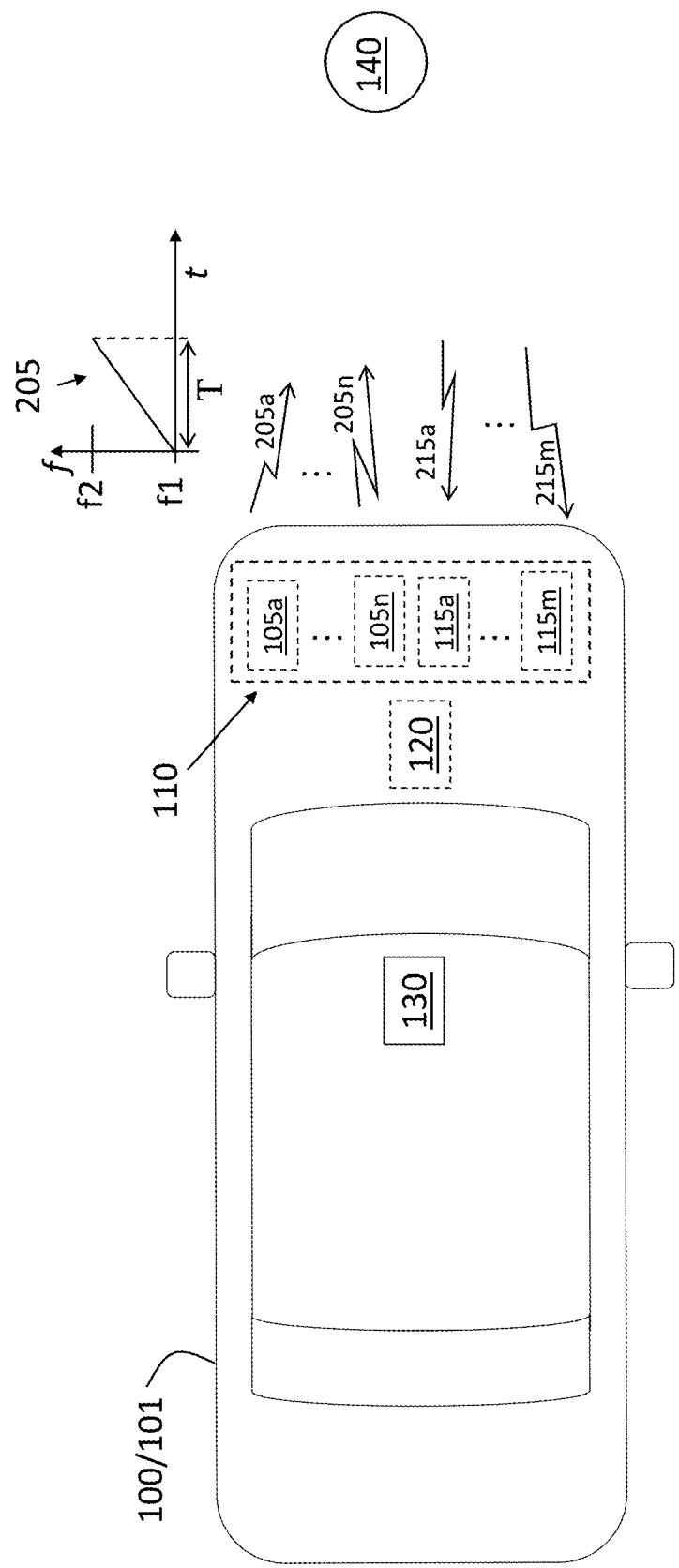
FIG. 1 is a block diagram of a vehicle with a radar system that employs frequency division multiple access (FDMA)

The following description is merely exemplary in nature and is not intended to limit the present disclosure, its application or uses. It should be understood that throughout the drawings, corresponding reference numerals indicate like or corresponding parts and features.

As previously noted, radar systems are among the sensors that may be used to obtain information about a vehicle and its environment. MIMO radar systems require some mechanism to separate the reflections resulting from transmissions by each of the multiple transmitters. Generally, each transmission is a linear frequency modulated continuous wave (LFMCW) signal with a linearly increasing or decreasing frequency over a period of time. This LFMCW signal is referred to as a chirp. A TDMA scheme, which requires a time lag between chirps transmitted by each transmitter, does not benefit from the increased emitted power that simultaneous transmissions yield. CDMA, which requires that each transmitter transmit a different code sequence (i.e., a differently coded chirp), results in Doppler ambiguity (i.e., ambiguity in the radial velocity of a detected object).

Prior FDMA approaches have drawbacks, as well. In a prior FDMA scheme, the frequency band is divided among the transmitters such that chirps transmitted by different transmitters do not use the same frequencies over their chirp periods. As a result, the bandwidth available to each chirp is limited by the number of transmitters. This is discussed below as a first issue with prior FDMA approaches. Also in the prior FDMA scheme, the range-dependence of angle estimation, as further detailed, results in inefficient processing of received reflections. This is discussed below as a second issue with prior FDMA approaches. Embodiments of the systems and methods detailed herein relate to a radar system of a vehicle employing FDMA with a frequency shift and with processing of reflections that addresses the issues of prior approaches.

In accordance with an exemplary embodiment, FIG. 1 is a block diagram of a vehicle 100 with a radar system 110 that employs FDMA. The exemplary vehicle 100 shown in FIG. 1 is an automobile 101. The vehicle 100 includes a MIMO radar system 110 with transmit elements 105a through 105n (generally referred to as 105) and receive elements 115a through 115m (generally referred to as 115). According to different embodiments, a subset of transmit elements 105 and receive elements 115 may be used based on the number of transmit channels being less than the number of transmit elements 105 and the number of receive channels being less than the number of receive elements 115.

In the exemplary illustrated case, the transmit elements 105a through 105n respectively emit transmit signals 205a through 205n (generally referred to as 205), and the receive elements 115a through 115m respectively receive reflections 215a through 215m (generally referred to as 215). In the exemplary scenario, each reflection (e.g., reflection 215a) results from some of the energy of the transmit signals 205a through 205n being reflected by an object 140 in the field of view of the radar system 110. The object 140 may be another vehicle, a pedestrian, a sign, or a building, for example.

An exemplary transmit signal 205 is shown. Time is indicated over the axis t and frequency is indicated over the axis f. As indicated, the exemplary LFMCW signal (i.e., chirp) has a frequency that increases linearly from an initial frequency f1 to a final frequency f2 over time T. Thus, the slope a of the chirp is (f2−f1)/T. A given reflection 215 at a given receive element 115 is a sum of the reflected energy resulting from all the emitted transmit signals 205a through 205n. The vehicle 100 may include other sensors 130 (e.g., cameras, lidar system). The number and relative arrangement of the transmit elements 105 and receive elements 115, as well as the number and locations of the other sensors 130, are not limited by the exemplary illustration.

The vehicle 100 includes a controller 120 that obtains information from the radar system 110 and one or more of the other sensors 130. The controller 120 may control or communicate with controllers that control semi-autonomous or autonomous operation of the vehicle 100 based on information obtained by the controller 120. The processing of reflections received by the receive elements 115 may be performed by a controller of the radar system 110, the controller 120, or a combination of the two. The controller of the radar system 110 and the controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
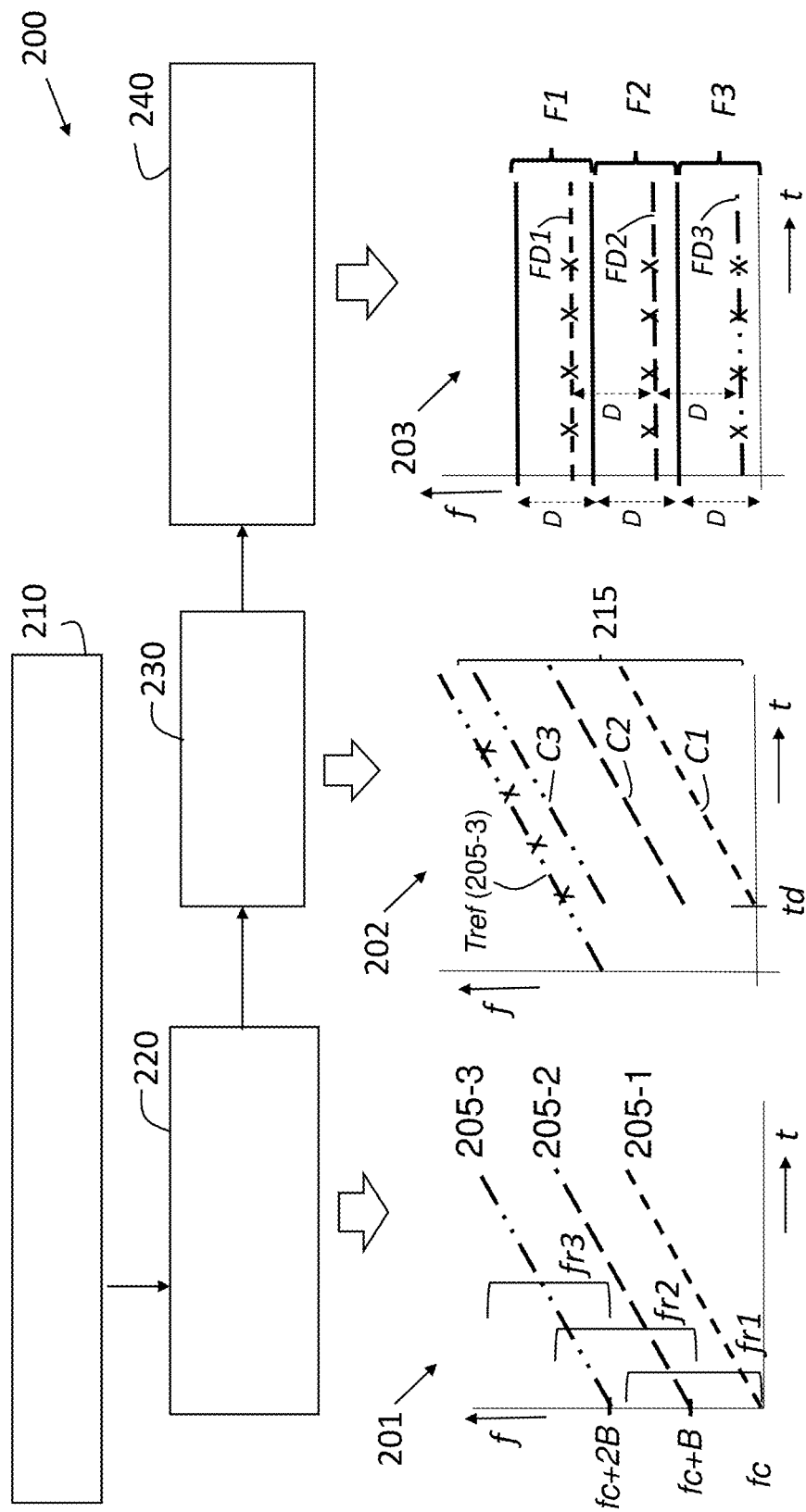
FIG. 2 is a process flow of a method for a radar system employing FDMA according to one or more embodiments.

FIG. 2 is a process flow of a method 200 of operating a radar system 110 employing FDMA according to one or more embodiments. Continuing reference is made to FIG. 1. The method 200 includes determining a frequency offset B between transmit signals 205 at block 210. This offset B is given as:

$$B = \frac{2}{s}R_{max}\alpha \quad [EQ. 1]$$

In EQ. 1, Rmax is the maximum detectable range and s is the speed of light. The term $(2/s)R_{max}$ is the round trip time from a transmit element 105 of the radar system 110 to an object 140 and back to radar system 110 and, specifically, to a receive element 115. Multiplying this term with the chirp slope a, which is the same for all the transmit signals 205, provides the maximal frequency shift that a transmitted chirp may undergo. By selecting the offset B on the basis of this maximal frequency shift, the frequency shift experienced by a given transmit signal 205 (of a given transmit element 105) at all detectable ranges is ensured to be in a frequency band that does not overlap the frequency band of anther transmit signal 205 (of another transmit element 105).

That is, adjacent transmit elements 105 may emit transmit signals 205 that are offset in frequency from each other by B. At block 220, transmitting multiple transmit signals 205 refers to transmitting simultaneously from the transmit elements 105. The transmit signals 205-1, 205-2, and 205-3 emitted from three exemplary transmit elements 105 are illustrated, as illustration 201, with different patterns for explanatory purposes. The frequency ranges fr1, fr2, and fr3 respectively spanned by each of the transmit signals 205-1, 205-2, and 205-3 are shown.

As indicated, the start frequency of each transmit signal 205 differs from the start frequency of the previous and subsequent transmit signal 205 by the frequency offset B. Thus, the start frequency for the transmit signal 205-1 is fc, the start frequency for the transmit signal 205-2 is fc+B, and the start frequency for the transmit signal 205-3 is fc+2B. Significantly, as the frequency ranges fr1, fr2, and fr3 indicate, the offset B ensures that there is an overlap among adjacent ones of the frequency ranges fr1, fr2, and fr3. As a result, the bandwidth of each transmit signal 205 is not limited to a third of the total bandwidth (in the exemplary case of three transmit elements 105). Instead, each of the three exemplary transmit signals 205-1, 205-2, and 205-3 have a respective frequency range fr1, fr2, or fr3 that spans more than a third of the total frequency range. This addresses the first issue noted for prior FDMA schemes.

At block 230, receiving reflections 215 refers to each receive element 115 receiving a reflection 215 that results from all of the simultaneously transmitted transmit signals 205. That is, the reflection 215 received at each receive element 115 is a sum of the energy from all transmit signals 205 that is reflected to the receive element 115 by a given object 140. If the transmit signals 205 encounter more than one object 140, then the reflection 215 received at each receive element 115 is a sum of the reflected energy reflected by all the objects 140 toward the receive element 115.

One reflection 215 received at a given receive element 115 is shown in FIG. 2 as illustration 202. As indicated, the reflection 215 includes three components C1, C2, and C3 that respectively correspond with reflected energy of the three transmit signals 205-1, 205-2, and 205-3, as indicated by their patterns and labels. A reference transmit signal Tref, is also shown. The reference transmit signal Tref is selected, as part of the processing at block 220, 230, or 240, to be one of the transmit signals 205. In the exemplary case, the reference transmit signal Tref is transmit signal 205-3. As illustration 202 indicates, the reflection 215 is received at a time delay td after the transmission of the transmit signals 205. As illustration 202 also indicates, the components C1, C2, and C3 that respectively correspond with the contribution from each of the transmit signals 205-1, 205-2, and 205-3 to the reflection 215 have overlaps in frequency. These overlaps are addressed at block 240.

At block 240, multiplying each reflection 215 by the reference transmit signal Tref facilitates separating the components C1, C2, and C3 of the reflection 215 into separated frequency segments F1, F2, and F3, in the exemplary case, that correspond with each of the transmit signals 205-1, 205-2, and 205-3. FIG. 2 shows, as illustration 203, the result of multiplying the exemplary reflection 215 (shown in illustration 202) by the exemplary reference transmit signal Tref (i.e., the transmit signal 205-3 in the example). The result of the multiplication is the difference, at some time (e.g., td), in the frequency of the reference transmit signal Tref and the frequency of each of the components C1, C2, and C3 of the reflection 215.

In illustration 203, the "x" pattern on the reference transmit signal Tref (in illustration 202) is overwritten on the pattern of each component C1, C2, and C3 of the reflection 215 (in illustration 202) for identification of the multiplication results FD1, FD2, and FD3. The frequency segments F1, F2, and F3 corresponding with the multiplication results are also labelled. These frequency segments F1, F2, and F3 are further discussed. As illustration 203 indicates, component C3 of the reflection 215, which has the closest frequency to the frequency of the reference transmit signal Tref (as shown in illustration 202), has the lowest frequency difference FD3 in illustration 203. On the other hand, component C1 of the reflection 215, which has the farthest frequency from the frequency of the reference transmit signal Tref (as shown in illustration 202), has the highest frequency difference FD1 in illustration 203.

As illustration 203 also indicates, each of the frequency segments F1, F2, and F3 spans a frequency range corresponding with a frequency shift D. In addition, each component of the multiplication result is separated from an adjacent component of the multiplication result by the frequency shift D. The frequency shift D is proportional to the offset B among the transmit signals 205. That is, frequency segments F1, F2, and F3 are a function of corresponding frequency shifts 0, B, 2B and, consequently, a function of range to an object 140 reflecting transmit signals 205.

For example, multiplying the component C3 (in illustration 202) with the reference transmit signal Tref results in a constant frequency for FD3 (as shown in illustration 203). This constant frequency is proportional to range of the object 140. That is, the constant frequency, which is within the frequency segment F3, is the result of EQ. 1 that is obtained by using the range to the object 140 rather than $R_{max}$. Multiplying the component C2 (in illustration 202) with the reference transmit signal Tref also results in a constant frequency for FD2 (as shown in illustration 203). This constant frequency is also proportional to range of the object 140. However, this resulting constant frequency ("resulting frequency"), which is within the frequency segment F2, is the result of EQ. 1 that is obtained by adding the frequency shift B, in addition to using the range to the object 140 ($R_{object}$) rather than $R_{max}$. That is, EQ. 1 is modified as:

$$\text{resulting frequency} = B + \frac{2}{s} R_{object} \alpha \qquad [\text{EQ. 2}]$$

Similarly, the constant frequency that results for FD1 (as shown in illustration 203) from multiplying C1 (shown in illustration 202) with the reference transmit signal Tref is within the frequency segment F1 and results from modifying EQ. 1 by adding 2B, which is the associated offset, rather than B, as show in EQ. 2.

To be clear, the frequency ranges fr1, fr2, and fr3 (shown in illustration 201) that are respectively spanned by each of the transmit signals 205-1, 205-2, and 205-3 do overlap (as shown in illustration 201). But, the frequency segments F1, F2, and F3 (shown in illustration 203) that result from multiplying each of the received components C1, C2, and C3 of the reflection 215 (shown in illustration 202) by the reference transmit signal Tref do not overlap. This is a result of the frequency offset between adjacent ones of the frequency ranges fr1, fr2, fr3 being B. As previously noted, by selecting the offset B on the basis of the maximal possible frequency shift (as discussed with reference to EQ. 1), the frequency shift experienced by a given transmit signal 205 (which spans frequency range fr1, fr2, or fr3) at all detectable ranges is ensured to be in a frequency band (F1, F2, or F3) that does not overlap the frequency band associated with another transmit signal 205.

The multiplication at block 240 (i.e., the subtraction in frequency) facilitates a focus on a frequency difference at a given time (e.g., td) rather than on the overlapping frequency range of the components C1, C2, and C3 shown in illustration 202 for the reflection 215. Because the transmit signals 205 that cause the components C1, C2, and C3 of the reflection 215 are separated by a frequency shift B, the frequency difference results, shown in illustration 203, are separated by frequency shift D, which is proportional to B. The frequency shift D is further explained.

As illustration 202 shows, if the time delay td increases, the frequency difference at a given time (e.g., td) between the reference transmit signal Tref and each of the components C1, C2, and C3 of the reflection 215 will also increase. The time delay td is a function of the range to the reflecting object 140 (e.g., as the range to an object 140 increases, the time delay td for a transmit signal 205 to reach the object 140 and return as a reflection 215 also increases). That is, for example, the maximum time delay td corresponds with the maximum detectable range Rmax.

Thus, the difference (at block 240) between the frequency of the reference transmit signal Tref and the frequency of each of the components C1, C2, and C3 of the reflection 215 will be the maximum when a reflecting object 140 is at the maximum detectable range Rmax and, correspondingly, the time delay td is maximum. This maximum frequency difference corresponds with the frequency shift D, which, like the offset B, is proportional to the maximum detectable range Rmax. The fact that the frequency difference results at block 240, shown in illustration 203, are separated by frequency shift D and the fact that each of the frequency segments F1, F2, and F3 is separated rather than overlapping facilitates efficiencies in the processing of the multiplication result, as further discussed with reference to FIG. 3. These efficiencies address the second issue noted for prior FDMA approaches.

Before processing of the result of block 240 is discussed with reference to FIG. 3, typical detection processing is outlined for explanatory purposes. Generally, two fast Fourier transforms (FFTs) are performed. The first is along range and the second is along Doppler, which corresponds with radial velocity. More specifically, the first (range) FFT is performed per transmit signal 205 (i.e., chirp) to implement a range match filter processing. The second (Doppler) FFT is performed per each range bin of the first FFT result for all the simultaneously transmitted signals 205 to implement a Doppler match filter processing. Following the FFTs, range-Doppler maps are obtained for each combination of transmit element 105 and receive element 115. Each range-Doppler map indicates a set of range bins, a set of Doppler bins, and an intensity associated with each range bin and Doppler bin combination. A beamforming process is performed on the range-Doppler map to identify and locate (i.e., obtain direction of arrival (DOA)) each detected object 140.

Figure 3:
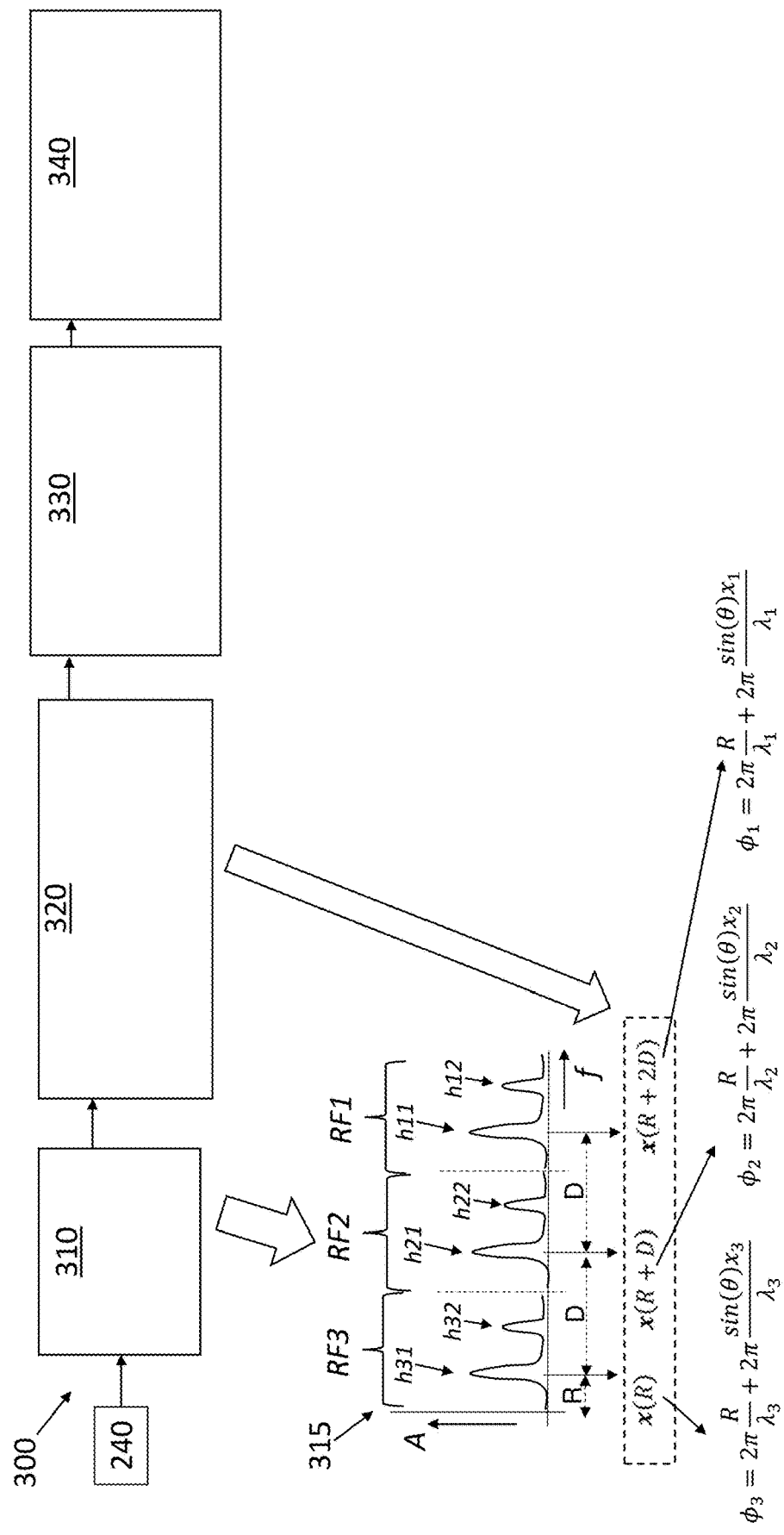
FIG. 3 is a process flow of a method of detecting objects with a radar system employing FDMA according to one or more embodiments.

FIG. 3 is a process flow of a method 300 of detecting objects 140 with a radar system 110 employing FDMA according to one or more embodiments. Continuing reference is made to FIG. 2. For explanatory purposes, the exemplary three transmit signals 205 with overlapping frequency ranges fr1, fr2, and fr3 (shown in illustration 201) are assumed again. The result at block 240 (the frequency differences FD1, FD2, FD3 in the exemplary case) is an input to the processes of the method 300, as indicated. At block 310, performing range FFT is on a per transmit signal 205 basis. The result is shown as 315, which indicates that the range FFT results RF3, RF2, and RF1 do not overlap. As indicated frequency f is shown along one axis and amplitude A is shown along the other. Each range FFT result RF3, RF2, and RF1 includes two exemplary range hypotheses, as indicated. A range hypothesis refers to a peak in amplitude A that exceeds a defined threshold. The range FFT result RF3 includes hypotheses h31, h32; range FFT result RF2 includes hypotheses h21, h22; and range FFT result RF1 includes hypotheses h11, h12).

At block 320, extracting range bins associated with each transmit element 105 for corresponding range hypotheses is illustrated for corresponding range hypotheses h31, h21, and h11. The range R to the range hypothesis h31 is indicated. The range to each subsequent range hypothesis is at a multiple of the frequency shift D from the range R. The frequency shift D is proportional to the offset B and both are a function of range (i.e., both correspond to $R_{max}$). Thus, the ranges corresponding to hypotheses h31, h21, and h11 (i.e., x(R), x(R+D), x(R+2D)) are offset by D (like the frequency differences FD3, FD2, and FD1 in illustration 203). The phase shift ϕ (from the transmit signal 205) indicated by the reflection 215 associated with each transmit signal 205 is a function of the azimuthal angle of arrival θ to the object 140 resulting in the reflection 215. Without FDMA (i.e., when the center wavelength λ of every transmit signal 205 is the same), the difference in phase shift ϕ indicated by the reflection 215 associated with each transmit signal 205 depends only on DOA and not additionally on range. That is, there is no range-dependent term in the beamforming process (at block 340). But, FDMA gives rise to the need for a different beamforming matrix per range. This increases the complexity of the processing considerably relative to a non-FDMA system.

According to one or more embodiments, the issue of the inefficiency that can result from FDMA is addressed, as discussed. Specifically, compensation for phase variations according to range bin (at block 330) facilitates using the same beamforming matrix regardless of the transmit signal 205 giving rise to the reflection 215. In FIG. 3, the phase shifts $\phi_3$, $\phi_2$, and $\phi_1$ associated with each of the transmit signals 205-3, 205-2, and 205-1 are indicated. The wavelengths $\lambda_3$, $\lambda_2$, and $\lambda_1$ correspond to the center frequency of each of the exemplary transmit signals 205-3, 205-2, 205-1. The positions of the exemplary three transmit elements 105 corresponding with the transmit signals 205-3, 205-2, 205-1 are $x_3$, $x_2$, and $x_1$. An optional Doppler FFT may follow the range FFT performed at block 320.

At block 330, compensating for phase variations according to range bin takes advantage of the known relationship among the range bins, which is related to the frequency shift B between transmit signals 205. The reflection 215 representation as vector z, below, compensates for range-dependency. Specifically, $$z = \begin{bmatrix} x(R)e^{-j2\pi R/\lambda_3} \\ x(R+D)e^{-j2\pi R/\lambda_2} \\ x(R+2D)e^{-j2\pi R/\lambda_1} \end{bmatrix} \quad [\text{EQ. 3}]$$

As a result, performing the beamforming process, at block 340, uses the same beamforming matrix A for each element of vector z. Specifically, the beamforming matrix A is made up of as many vectors $(a(\theta_i))$ as there are hypotheses of azimuthal angles of arrival $\theta$. Thus, for p hypotheses, A is given by:

$$A = [a(\theta_0), a(\theta_1), \ldots, a(\theta_p)] \quad [\text{EQ. 4}]$$

Each of the vectors $a(\theta_i)$ is the array response to angle $\theta_i$ when range dependency is eliminated and is given by:

$$a(\theta_i) = \begin{bmatrix} e^{-j2\pi \frac{\sin(\theta_i)x_3}{\lambda_3}} \\ e^{-j2\pi \frac{\sin(\theta_i)x_2}{\lambda_2}} \\ e^{-j2\pi \frac{\sin(\theta_i)x_1}{\lambda_1}} \end{bmatrix} \quad [\text{EQ. 5}]$$

While each of the vectors $a(\theta_i)$ is shown with three elements for the exemplary case of three transmit signals 205, the number of elements of each vector $a(\theta_i)$ will depend on the number of transmit signals 205 and, correspondingly, the number of elements of the vector z. The beamforming process includes multiplying the vector z with the Hermitian transpose (indicated by H) of the beamforming matrix A as indicated in EQ. 6.

$$y = A^H z \quad [\text{EQ. 6}]$$

As part of the beamforming process at block 340, peak detection per range is implemented to identify and locate objects 140. That is, each value of the vector y corresponds with one of the hypotheses of azimuthal angles of arrival $\theta$. Thus, every value of y that exceeds a defined detection threshold value indicates the location of an object 140 based on its corresponding $\theta_i$ value. As previously noted, the controller 120 may use this location information to control aspects of the operation of the vehicle 100.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of implementing frequency division multiple access (FDMA) in a radar system of a vehicle, the method comprising:
   transmitting a chirp signal from each of a plurality of transmit elements of the radar system simultaneously, the chirp signal transmitted by each of the plurality of transmit elements increasing or decreasing linearly in frequency over a frequency range over a duration of time and the frequency range of the chirp signal transmitted by adjacent ones of the plurality of transmit elements partially overlapping; and
   processing a reflection received based on reflection of the chirp signal transmitted by the plurality of transmit elements by one or more objects; and
   controlling an operation of the vehicle based on locating the one or more objects,
   wherein the chirp signal transmitted by every one of the plurality of transmit elements has a same slope,
   wherein a start of the frequency range of the chirp signal transmitted by every one of the plurality of transmit elements differs from the start of the frequency range of the chirp signal transmitted by every other one of the plurality of transmit elements by a different multiple of a frequency offset, and
   wherein the frequency offset is based at lease in part on a maximum detectable range of the radar system.

2. The method according to claim 1, wherein the frequency offset is B and is given by:

$$B = \frac{2}{s} R_{max} \alpha,$$

where
   s is the speed of light, $R_{max}$ is the maximum detectable range of the radar system, and $\alpha$ is the slope.

3. The method according to claim 1, further comprising multiplying the reflection with a reference signal to obtain a frequency difference result, wherein the reference signal is one of the chirp signals transmitted by one of the plurality of transmit elements and the frequency difference result separates a component of the reflection corresponding with each chirp transmitted by the plurality of transmit elements into a different frequency range.

4. The method according to claim 3, wherein the frequency difference result associated with each of the plurality of transmit elements includes components separated from the frequency difference result associated with every other one of the plurality of transmit elements by a frequency shift D.

5. The method according to claim 4, further comprising performing a range fast Fourier transform (FFT) on the frequency difference result.

6. The method according to claim 5, further comprising identifying a range bin associated with a range hypothesis corresponding with each of the components.

7. The method according to claim 6, further comprising compensating for phase variations according to the range bin identified in correspondence with each of the components to obtain a vector z in terms of absolute range that represents the reflection, wherein a number of elements of the vector z is a number of the components.

8. The method according to claim 7, further comprising performing beamforming with a range-independent beamforming matrix and applying a detection threshold to locate the one or more objects.

9. A vehicle with a radar system implementing frequency division multiple access (FDMA), the vehicle comprising:
a plurality of transmit elements of the radar system, each of the plurality of transmit elements is configured to transmit a chirp signal simultaneously, the chirp signal transmitted by each of the plurality of transmit elements increasing or decreasing linearly in frequency over a frequency range over a duration of time and the frequency range of the chirp signal transmitted by adjacent ones of the plurality of transmit elements partially overlapping; and
a controller configured to process a reflection received by a receive element of the radar system based on reflection of the chirp signal transmitted by the plurality of transmit elements by one or more objects and to control an operation of the vehicle based on locating the one or more objects,
wherein the chirp signal transmitted by every one of the plurality of transmit elements has a same slope,
wherein a start of the frequency range of the chirp signal transmitted by every one of the plurality of transmit elements differs from the start of the frequency range of the chirp signal transmitted by every other one of the plurality of transmit elements by a different multiple of a frequency offset, and
wherein the frequency offset is B and is given by:

$$B = \frac{2}{s} R_{max} \alpha,$$

where
s is the speed of light, $R_{max}$ is the maximum detectable range of the radar system, and $\alpha$ is the slope.

10. The vehicle according to claim 9, wherein the controller is configured to multiply the reflection with a reference signal to obtain a frequency difference result, wherein the reference signal is one of the chirp signals transmitted by one of the plurality of transmit elements and the frequency difference result separates a component of the reflection corresponding with each chirp transmitted by the plurality of transmit elements into a different frequency range.

11. The vehicle according to claim 10, wherein the frequency difference result associated with each of the plurality of transmit elements includes components separated from the frequency difference result associated with every other one of the plurality of transmit elements by a frequency shift D.

12. The vehicle according to claim 11, wherein the controller is configured to perform a range fast Fourier transform (FFT) on the frequency difference result.

13. The vehicle according to claim 12, wherein the controller is configured to identify a range bin associated with a range hypothesis corresponding with each of the components.

14. The vehicle according to claim 13, wherein the controller is configured to compensate for phase variations according to the range bin identified in correspondence with each of the components to obtain a vector z in terms of absolute range that represents the reflection, a number of elements of the vector z being a number of the components.

15. The vehicle according to claim 14, wherein the controller is configured to perform beamforming with a range-independent beamforming matrix and apply a detection threshold to locate the one or more objects.

* * * * *